United States Patent Office 3,000,642
Patented Sept. 19, 1961

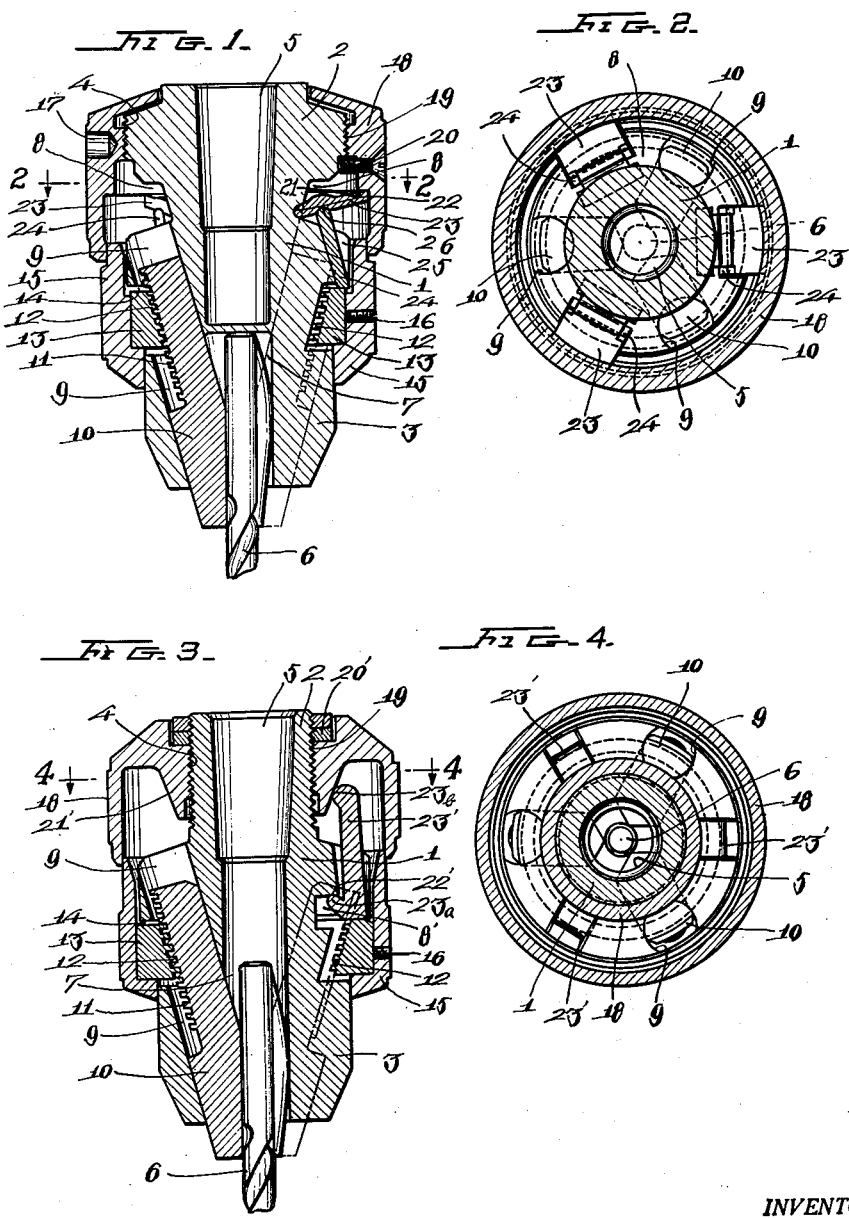

3,000,642
DRILL CHUCK
Kiyoshi Kawasaki, 4619 Shimada-shi,
Shizuoka-ken, Japan
Filed Nov. 6, 1959, Ser. No. 851,430
Claims priority, application Japan Nov. 26, 1958
3 Claims. (Cl. 279—62)

This invention relates to a drill chuck.

A chuck to attach a drilling tool to the drilling machine is required to clamp the tool firmly thereto to prevent the latter from unintentionally loosening. It is thereby further required that the clamping operation is simple and efficient without necessity of exerting a large quantity of manual efforts, but with ease. The dismantling operation to remove the tool from the chuck must also be simple as in the case of clamping of the tool. The invention provides means which completely meet the above mentioned requirements.

It is conventional practice in use with a drill chuck that a plurality of clamping jaws are provided to force-clamp a drilling tool at its peripheral surface of the stem. It is also known per se, that the clamping jaws clamp the tool or release it from the clamped conditions with the help of screw means.

The drill chuck constructed in accordance with this invention also utilizes the above mentioned conventional means for the same purpose as mentioned just above. This invention comprises further, however, an additional mechanism relying on the lever principle, in order to obtain a still stronger gripping force, as well as to make the manipulating operation for clamping and releasing the drilling tool still easier.

A main object of the invention is, therefore, to provide a drill chuck, with which a much stronger clamping force is obtainable than in the conventional drill chucks relying only upon the screw means to grip the tool.

Another object of the invention is to provide a drill chuck, in which the manipulating operation for clamping the tool does not require excessive muscular efforts, but may be carried into effect in a simple and easy manner.

Still another object of the invention is to provide a drill chuck, wherein dismantling of the drilling tool may be carried into effect in a simple and easy way and without consuming much muscular effort, as in the case of clamping of the tool.

The foregoing and other objects and advantages of the invention will appear more fully hereinafter from a consideration of the detailed description which follows, taken together with the accompanying drawings wherein two preferred embodiments of the invention are illustrated by way of example. It is to be expressly understood, however, that the drawings are for illustration purposes only, and are not to be construed as defining the limits of the invention.

In the drawings, wherein like reference numerals refer to like parts:

FIG. 1 shows a longitudinal section of a drill chuck constructed according to the first embodiment, wherein the drilling tool is clamped in position;

FIG. 2 is a horizontal section of the drill chuck taken on the line 2—2 in FIG. 1 looking in the direction of arrows 2—2;

FIG. 3 is a longitudinal section of a different drill chuck from that shown in FIGS. 1 and 2, but constructed according to the second embodiment of the invention, wherein the drilling tool is firmly gripped by a plurality of clamping jaws;

FIG. 4 is a horizontal section of the drill chuck shown in FIG. 3, taken on the line 4—4 in the last mentioned figure looking in the direction of arrows 4—4.

Now, referring to the drawings, reference number 1 denotes a main body comprising a head portion 2 and skirt portion 3, head portion being larger than the skirt portion, as clearly seen from FIG. 1. The head portion 2 is formed with female screw threads 4 cut thereon and provided at its relatively upper centre with a longitudinal bore 5, by means of which the drill chuck assembly can be attached to the drilling machine. For this purpose, the longitudinal bore 5 is slightly tapered. The main body 1 is formed at its relatively lower centre with a vertical bore 7 extending longitudinally of the body and adapted to receive a drill 6 from below. The main body 1 is formed with a lateral recess 8 adjacent and directly below the head 2, and three inclined grooves 9 extending from said recess 8 downwards to the lower end of said vertical bore 7. These grooves 9 are arranged, as illustrated in FIG. 2, at equal angular intervals in a cross-sectional plane, and adapted to receive drill-clamping jaws 10 to serve for clamping of the drill from outside. Each of said clamping jaws 10 is formed at its upper half with rack teeth 11, which engage a ring clamp 13 having female screw threads 12 to mesh with said rack. It will thus be clear from the foregoing that when the ring clamp is turned to the right or left, as the case may be, the jaws 10 move correspondingly and simultaneously upwards or downwards, while frictionally engaging with inclined grooves 9. The main body 1 is formed with a circular recess 14 for the reception of said ring clamp 13, said recess having enough play to allow the latter to move in the vertical direction. Should the ring clamp 13 be made in a complete or endless ring, it can not be inserted in the circular recess 14. To avoid this, the ring clamp 13 is made in a split construction for easy mounting and dismounting thereof. Upon insertion of said split clamp 13 in the recess 14, an outside shell 15 is slipped thereon and then firmly fixed thereto a plurality of set screws 16.

Thus, by turning the shell 15 in the tightening direction, the clamp 13 is rotated therewith and the drill clamping jaws 10 in engagement with the clamp will thereby be lowered, thus clamping the drill 6. On the contrary, if the shell 15 is turned in the opposite or loosening direction, the jaws 10 will be shifted upwards to release the drill 6. Such a construction and function of a drill chuck are naturally conventional.

An operating screw cap 18 is screwed on the head 2 of main body 1. For this purpose, the screw cap 18 is formed with female screw threads 19 adapted to mesh with male screw threads 4 cut on the head 2. The screw cap 18 is further provided with a traverse opening 17 drilled from outside and adapted to receive a handle bar (not shown) for turning operation of the cap. A screw stopper 20 is provided for the prevention of disengagement of screw cap 18 from head 2. The screw cap 18 is further provided with a shoulder 21 on the inside wall surface thereof, while a receiving recess 22 is formed in the lateral recess 8 adjacent the upper end of one of said grooves 9. A lever plate 23 is provided, having one of its ends disposed within said receiving recess 22 and its opposite end in contact with said shoulder 21, as is clearly seen from the sectional view of FIG. 1.

An intermediate or transmitting plate 24 is provided, which abuts with its lower end against the upper edge surface of ring clamp 13, while the upper end of said transmitting plate 24 is received in a recess 26, which is formed on the lower surface of lever plate 23. Thus, the force exerted upon lever plate 23 is transmitted through the intermediary of said intermediate plate 24 to ring clamp 13. For the purpose of stabilized positioning of intermediate plate 24, a receiving recess 25 is formed on main body 1 and extending from lateral recess 8 to circular recess 14, for tight reception of plate 24.

Thus, it will be clear, that when the screw cap 18 is turned in its lowering direction, it presses with its shoulder 21 against the outer end of lever plate 23, resulting in the lever plate 23 depressed in the downward direction. By this downward pressure, the ring clamp 13 is pressed again in the downward direction through the intermediary of transmitting plate 24, thereby the clamp jaws 10 kept in engagement with said clamp 13 is also urged to move downwards.

In the use of the above described chuck, it is attached to the drilling machine by utilizing the longitudinal bore 5 and a drill 6 is inserted in the receiving bore 7 from below, as already referred to. When the outside shell 15 is turned, the split clamp 13 is thereby also rotated. Thus, the clamping jaws in engagement with the clamp 13 are raised or lowered, according to the rotational direction of shell 15, thereby the drill 6 is released or clamped, as in the conventional manner. The structure of the invention is such that in the case of fixedly mounting the drill 6 the operator may turn the screw cap 18 to advance it in the downward direction, after the drill having been clamped as in the abovementioned conventional manner. By so doing the lever plate 23 is depressed at its outer end by the pressure exerted by the inner shoulder on said screw cap 18 and the ring clamp 13 is thereby pressed further downwards, thus shifting the clamping jaws 10 even further in the downward direction, in order to forcibly press them with their lower ends between the skirt 3 of main body 1 and the drill 6 and thereby tightly pressing these jaws against the peripheral surface of the drill stem. This additional pressing operation to force the jaws upon the stem surface of the drill will obviously increase the gripping force of the jaws and the drill can be more firmly clamped than in the case of conventional drill chucks.

If the operating screw cap 18 is turned in the reverse direction, the pressure exerted by the lever plate 23 upon the gripping jaws 10 may be released. Thus, by turning the ring clamp 13 in this manner, the drill will no longer be in its force-clamped condition and thus may be removed from the chuck in an easy and simple manner.

Next, a second embodiment of the invention will be explained hereinafter in detail in connection with FIGS. 3 and 4. In these figures the same reference numbers have been used to show similar elements of the device to those illustrated in the first embodiment shown in FIGS. 1 and 2.

In the present embodiment, the head 2 of main body 1 has a relatively smaller outside diameter and is provided with male screw threads 4 substantially over the entire outside surface of the head. The main body 1 is formed with a longitudinal bore at its centre, passing therethrough from the upper end to the lower end, said bore serving with its relatively upper portion as the aforementioned mounting bore 5, by means of which the drill chuck is attached to the machine, on the one hand, and with its relatively lower portion as the aforementioned vertical bore for receiving the drilling tool 6.

The upper bore portion corresponding to the mounting bore 5 is slightly tapered as in the preceding embodiment. A plurality of, say, preferably three, inclined grooves each for receiving a gripping jaw 10 extend from the lowermost end of bore 7 upwardly and outwardly towards the central zone of the outside surface of main body 1, said grooves being radially arranged at equal angular intervals, as seen in the horizontal section illustrated in FIG. 4. As in the preceding embodiment, the main body 1 is formed at its central zone on the outside surface thereof with a circular recess 14 crossing the jaw-receiving inclined grooves 9, and the ring clamp 13 is inserted in the recess 14 where clamp 13 is loosely fitted and engages with its female screw 12 with rack teeth 11 formed on the upper half of each clamp jaw 10.

As in the preceding embodiment, an outside shell 15 is fitted firmly on the ring clamp 13 by means of a set screw 16, so that by turning the shell 15 the ring clamp may be rotated. A screw cap 18 is screwed on the head 2 of main body 1, just in the same manner as in the first embodiment, thus the female screw threads 19 on screw cap 18 mesh with male screw threads 4 on head 2 of main body 1. A lock nut 20' is provided to prevent any possible loosening of the aforementioned screw connection. The screw cap 18 is formed at its inside part with a cone-shaped projection 21' projecting in the downward direction as seen from FIG. 3, while the main body 1 is provided with a plurality of recesses 8' at regular angular intervals and directly above the circular recess 14. A lever plate 23' abutting with its bottom end upon the upper end surface of ring clamp 13 and shaped as an angle lever, is provided with hook-shaped projection 23a in engagement with the upper edge 22' of said each recess 8', while the upper end of said lever plate 23' is kept in pressure contact with the tapered surface of said cone-shaped projection 21'. On the other hand, the screw cap 18 is positioned with its lower end portion kept in sliding engagement with the upper end portion of outside shell 15.

When the outside shell 15 is turned in its tightening direction, the ring clamp 13 is also rotated together therewith, thereby tool-gripping jaws 10 meshing with the ring clamp are simultaneously lowered to firmly grip the tool 6. Then, by turning the screw cap 18 it is turned so as to advance in the downward direction, the tapered surface of cone 21' presses the lever 23' upon its upper end 23b in the outward direction, thus turning in the clockwise direction in FIG. 3 about the hooked end 23a of said lever and thus pressing the engaging upper end surface of ring clamp 13 to move the latter in the downward direction. This movement of the ring clamp 13 causes the tool-gripping jaws 10 to clamp the drilling tool still more firmly, as in the similar manner already described in connection with the first embodiment of the invention.

Although only two particular embodiments of the invention are herein disclosed for purposes of explanation, further modifications thereof, after study of this specification, will be apparent to those skilled in the art to which the invention pertains. Reference should accordingly be had to the appended claims in determining the scope of the invention.

What I claim is:

1. A chuck of the class described comprising a body portion, a plurality of jaws slidably mounted in said body portion and guided for movement along converging paths, a threaded member mounted to said body portion and engageable with said jaws for moving the jaws toward closed and opened position, and a mechanism for moving said jaws toward closed position for firmly gripping a device after said jaws have been brought into engagement therewith by said threaded member, said mechanism comprising a lever means pivoted at one end to said body portion, an actuating element carried by said body portion and movable in respect thereto in operative engagement with the lever means at the other end thereof, movement of said element relative to said body portion being effective to pivot said lever means relative to said housing, and transmitting means interposed between said threaded member and said lever means for transmitting motion of said lever means directly to said threaded member.

2. A chuck as set forth in claim 1 in which the transmitting means is mounted with one of its ends abutting the threaded member and the other end abutting the lever means between the ends thereof.

3. A chuck as set forth in claim 2 in which the transmitting means other end abuts the lever means by entrance into depression means thereof.

References Cited in the file of this patent
UNITED STATES PATENTS

| | | |
|---|---|---|
| 157,357 | Stetson | Dec. 1, 1874 |
| 299,964 | Crary | June 10, 1884 |
| 558,242 | Weir | Apr. 14, 1896 |
| 2,042,197 | Stoner | May 29, 1936 |
| 2,458,626 | Norige | Jan. 11, 1949 |